(12) United States Patent
Stapfer

(10) Patent No.: US 11,403,905 B2
(45) Date of Patent: **\*Aug. 2, 2022**

(54) DEVICE AND METHOD FOR COUNTING BUNDLES OF VALUE DOCUMENTS, IN PARTICULAR BUNDLES OF BANK NOTES

(71) Applicant: GIESECKE+DEVRIENT CURRENCY TECHNOLOGY GMBH, Munich (DE)

(72) Inventor: Michael Stapfer, Neubiberg (DE)

(73) Assignee: GIESECKE+DEVRIENT CURRENCY TECHNOLOGY GMBH, Munich (DE)

( \* ) Notice: Subject to any disclaimer, the term of this patent is extended or adjusted under 35 U.S.C. 154(b) by 98 days.

This patent is subject to a terminal disclaimer.

(21) Appl. No.: 15/757,772

(22) PCT Filed: Sep. 15, 2016

(86) PCT No.: PCT/EP2016/001546
§ 371 (c)(1),
(2) Date: Mar. 6, 2018

(87) PCT Pub. No.: WO2017/045757
PCT Pub. Date: Mar. 23, 2017

(65) Prior Publication Data
US 2018/0342126 A1      Nov. 29, 2018

(30) Foreign Application Priority Data
Sep. 16, 2015   (DE) ..................... 10 2015 012 148.0

(51) Int. Cl.
*G01N 21/64*      (2006.01)
*G07D 11/50*      (2019.01)
(Continued)

(52) U.S. Cl.
CPC ............. *G07D 11/50* (2019.01); *G01N 21/64* (2013.01); *G06V 10/141* (2022.01);
(Continued)

(58) Field of Classification Search
CPC ............... G07D 11/50; G07D 2211/00; G07D 2207/00; G07D 7/1205; G06K 9/2027; G01N 21/64
See application file for complete search history.

(56) References Cited

U.S. PATENT DOCUMENTS

| | | | |
|---|---|---|---|
| 5,534,690 A | 7/1996 | Goldenberg et al. | |
| 2004/0003980 A1\* | 1/2004 | Hallowell | B65B 27/08 194/206 |

(Continued)

FOREIGN PATENT DOCUMENTS

| | | | |
|---|---|---|---|
| CN | 102298695 B | \* | 3/2013 |
| DE | 69625467 T2 | | 10/2003 |

(Continued)

OTHER PUBLICATIONS

German Search Report from DE Application No. DE 10 2015 012 148.0, dated Nov. 23, 2015.

(Continued)

*Primary Examiner* — John W Lee
(74) *Attorney, Agent, or Firm* — Workman Nydegger

(57) ABSTRACT

An apparatus and a corresponding method for counting value-document bundles, which contain respectively several value documents, in particular bank notes, combined to a bundle by a bundling element, such as a band, having an image-capturing device, which is configured to capture at least one image of the value-document bundles including bundling elements, and an evaluation device, which is configured to identify the bundling elements in the captured image and to establish their number.

19 Claims, 1 Drawing Sheet

(51) Int. Cl.
  *G07D 7/1205* (2016.01)
  *G06V 10/141* (2022.01)
(52) U.S. Cl.
  CPC ....... *G07D 7/1205* (2017.05); *G07D 2207/00* (2013.01); *G07D 2211/00* (2013.01)

(56) References Cited

U.S. PATENT DOCUMENTS

| | | | |
|---|---|---|---|
| 2005/0209966 A1* | 9/2005 | Demmeler | G07D 11/50 705/45 |
| 2007/0140551 A1* | 6/2007 | He | G06K 9/00 382/137 |
| 2012/0235351 A1* | 9/2012 | Sakoguchi | B65H 9/16 271/265.01 |
| 2014/0032396 A1* | 1/2014 | Sheng | G07D 11/30 340/10.4 |
| 2014/0147029 A1* | 5/2014 | Petker | G06M 9/00 382/199 |

FOREIGN PATENT DOCUMENTS

| | | | | |
|---|---|---|---|---|
| EP | 2282286 A1 * | 2/2011 | | B65H 29/001 |
| JP | 2000057401 A | 2/2000 | | |
| JP | 2005092801 A | 4/2005 | | |

OTHER PUBLICATIONS

International Search Report from PCT Application No. PCT/EP2016/001546, dated Nov. 23, 2016.

* cited by examiner

DEVICE AND METHOD FOR COUNTING BUNDLES OF VALUE DOCUMENTS, IN PARTICULAR BUNDLES OF BANK NOTES

BACKGROUND

The invention relates to an apparatus and a method for counting value-document bundles, in particular bank-note bundles, according to the preamble of the independent claims.

SUMMARY

For transporting bank notes within and outside of so-called cash centers or banks, the bank notes are combined into bank-note bundles, also called bank-note packs, and are placed in suitable transport containers. For security reasons, the content of the transport containers, depending on the case of application, is checked for completeness before, during and/or after the transport. This happens as a rule by manually counting the bank-note bundles located in the respective transport container. Because depending on the size of the transport container, typically up to 200 bank-note bundles can be located in a container, a manual counting operation is often relatively time-consuming. Further, errors during counting cannot be excluded. Not least, a documentary proof is absent for a manual counting operation.

It is the object of the invention to specify an apparatus and method which enables a faster and very secure counting of value-document bundles.

The apparatus according to the invention for counting value-document bundles which contain respectively several value documents, in particular bank notes, combined to a bundle by a bundling element, has: an image-capturing device, which is configured to capture at least one image of the value-document bundles including bundling elements, and an evaluation device, which is configured to identify the bundling elements in the captured image and to establish their number.

The method according to the invention for counting value-document bundles, which contain respectively several value documents, in particular bank notes, combined to a bundle by a bundling element, has the following steps: Capturing at least one image of the value-document bundles including bundling elements, identifying the bundling elements in the captured image and establishing the number of the bundling elements on the basis of the bundling elements identified in the image.

The invention is based on the approach of recording one or several images of the bank-note bundles to be counted including the respective bundling elements, such as bands, and recognizing and counting the bundling elements rendered in the recorded images. The recognition or identification of the bundling elements is effected preferably with methods of image processing, such as the image recognition. The bundling elements rendered in the recorded images differ as a rule distinctly from the bank-note bundles themselves and can hence be automatically identified and counted with high reliability and speed. The number of bundling elements established in this manner then corresponds to the number of the bank-note bundles.

Altogether the invention therefore enables a fast and secure counting of value-document bundles, in particular of bank-note bundles.

Preferably, the evaluation device is configured to identify the bundling elements on the basis of the shape and/or size and/or texture and/or by optical properties of the bundling elements. Preferably, the bundling elements rendered in the image are segmented and identified with the help of model- and/or texture-based methods. Here, upon the evaluation of the recorded images, data and/or models as to the form and/or size or surface condition of the bundling elements to be expected are taken into consideration. Alternatively or additionally, there can also be taken into consideration data stored in advance as to optical properties of the bundling elements, such as, where applicable, the wavelength-dependent, reflection behavior or remission behavior, the color and/or brightness of the bundling elements rendered in the image. With respect to the hereinabove mentioned properties, the usually employed bundling elements, such as bands, can be reliably distinguished in the respectively captured image from the bank-note bundles themselves and thus identified so that the number of the bank-note bundles can be established with especially high certainty.

It is further preferred that the evaluation device is configured to identify the bundling elements on the basis of a fluorescence behavior of the bundling elements. This is of particular advantage if the bundling elements contain fluorescent substances which show fluorescence upon irradiation with light of a certain wavelength region. The fluorescent substances can, for example, be so-called optical brighteners, such as titanium dioxide or calcium carbonate, which are frequently contained as so-called whitening agents in paper but not in bank notes. Upon irradiation with ultraviolet (UV) radiation or with visible light with a relatively high UV portions, the bundling elements then appear substantially brighter in the captured image than the other image regions in which the non-fluorescent parts of the bank-note bundles are rendered, and can be reliably distinguished from these and identified. The counting of the bank-note bundles therefore becomes even more reliable.

In a further preferred implementation, the apparatus has an illumination device which is configured for illuminating the value-document bundles including bundling elements, in particular with ultraviolet and/or infrared radiation. By illuminating the bank-note bundles, defined illumination conditions are ensured so that a fast and reliable identification and counting of the bank-note bundles can be effected independent of the respective light conditions of the environment. By illuminating the bundles with ultraviolet light, fluorescent objects, in particular fluorescent bundling elements, in the recorded image can be distinguished especially well from the other objects or object components. Furthermore it is, however, also possible to make security elements on the bundling element visible through irradiation of the bank-note bundles with ultraviolet and/or infrared radiation and to capture these in the image.

It is further preferred that the evaluation device is configured to identify bundling elements in the form of paper strips, in particular bands, by which the value documents of the respective value-document bundle are held together with. Through the optical brighteners contained as a rule in the paper, the bundling elements can be recognized and counted, as already explained hereinabove, with especially high reliability.

In a further preferred implementation, an output device for outputting information items is provided and the evaluation device is configured to compare the established number of the bundling elements or the bank-note bundles with a pre-specified number and to actuate the output device for outputting an information item in dependence on the result of the comparison. The pre-specified number can be e.g. the original number of the bank-note bundles picked in a cash center or a bank and placed in a transport container. If the comparison yields that the established number is identical to the pre-specified number, a corresponding optical and/or acoustic message is outputted in the output device, such as "OK" or "Number of bank-note packs correct". Otherwise, a correspondingly different message is outputted, such as for example "STOP", "Number of bank-note packs incorrect" or "Repeat counting operation".

Preferably a storage device is provided which is configured to store the captured image of the value-document bundles including bundling elements, in particular for the purpose of archiving. Preferably, the storing of the image data is effected together with data for identifying the respectively counted bank-note bundles, for example data for identifying a transport container in which the bank-note bundles to be counted are located. It can therefore subsequently be checked or confirmed, if needed, e.g. upon an complaint by a customer, on the basis of the respectively recorded image, how many bank notes were contained in the respective transport container.

In a further preferred embodiment, the apparatus has a housing in whose interior the image-capturing device and/or the illumination device is or are arranged, wherein the housing has at least one opening by which a value-document container, in which the value-document bundles to be counted are located, can be brought into the interior of the housing. The housing is configured such that the bank-note bundles to be counted are largely shielded from the ambient light so that the image capture can be effected with defined lighting conditions, which increases the reliability further.

Preferably, the size and/or form of the housing is adaptable to the size or form of different value-document containers. Therefore bank-note bundles which are delivered in transport containers of different size can also be counted quickly and reliably.

Alternatively it can be provided that the image-capturing device and/or the illumination device is or are attached at a room ceiling, in particular over a work table. Here the bank-note bundles to be counted are illuminated by the illumination device and/or by ambient light. In case of an illumination by the ambient light, the illumination device is not compulsory.

In a further preferred embodiment, the apparatus has a transport device which is configured to move the image-capturing device and the value-document bundles, which are located in particular in a value-document container, relative to each other during the image capture. This is in particular advantageous when the totality of the supplied, e.g. in a transport container, bank-note bundles to be counted extends beyond the field of view of the image-capturing device. Instead of only one image, several images of the bank-note bundles to be counted are recorded and the bundling elements rendered therein are identified and counted.

Preferably a communication device is provided which is configured to write the established number of the bundling elements to a storage element provided in a value-document container in which the value-document bundles to be counted are located. For example, the opening can be closed, in particular sealed, at the upper side of the transport container with a transparent cover so that on the one hand the bank-note bundles located in the transport container are outwardly visible and can be counted, and, on the other hand, an attempt at tampering can easily be recognized on the basis of a damage of the cover. An electronic seal can be provided at the cover, e.g. in the form of an RFID transponder with storage element, to which the communication device can write the established number by means of wireless communication and, where applicable, further data, such as institution, location and date of the counting.

Preferably, the bank-note bundles to be counted, for example in a transport container, are arranged such that the bank notes of the individual bank-note bundles rest or stand with their cut edges, in particular longitudinal-section edges, on a base area, e.g. on a bottom surface of the transport container, and the opposing cut edges or longitudinal-section edges including bundling element are visible from above, in particular from the upper side of the transport container. It is therefore ensured that the bundling elements of all bank-note bundles can be reliably captured by the image-capturing device.

BRIEF DESCRIPTION OF THE DRAWINGS

Further advantages, features and application possibilities of the present invention will result from the subsequent description in connection with the figures. There are shown.

DETAILED DESCRIPTION OF VARIOUS EMBODIMENTS

Figure 1:
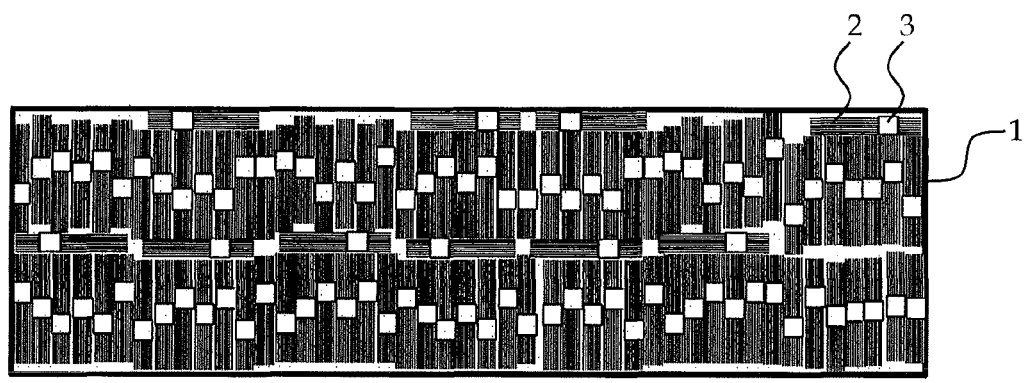
FIG. 1 an example in plan view of a transport container with bank-note bundles located therein.

FIG. 1 shows an example of a transport container 1 in plan view. In the represented example, the transport container 1 has a substantially rectangular base area on whose sides substantially vertical side walls are provided. The upper side opposing the base area of the transport container 1 can be left open or, however, also be provided with a, in particular transparent, cover.

In the present example, a plurality of bank-note bundles 2 is located in the transport container 1. Each of the bank-note bundles 2 has a plurality of individual bank notes which are combined to a bundle and/or are held together with the help of a suitable bundling element 3. Typically, respectively only bank notes of one nominal value, such as 50 euro notes or 100 euro notes, are located in a bank-note bundle 2.

In the present example, the respective bundling elements 3 of the bank-note bundles 2 are configured as so-called bands. A band is preferably a paper strip on which optionally data as to origin and/or processing can be imprinted.

Alternatively or additionally, it is, however, also possible to provide other kinds of bundling elements 3, such as a transparent or opaque foil in which respectively a bank-note bundle 2 is shrink-wrapped or wrapped up.

In the represented example, the individual bank-note bundles 3 are deposited upright in the transport container 1, i.e. the bank notes in the respective bundle 2 rest with their cut edges in the longitudinal direction on the base plate of the transport container 1. Therefore the respective bundling element 3 of the bank-note bundle 2 is visible from the upper side of the transport container 1. Here it is irrelevant whether the bank-note bundles 2 are lined up substantially perpendicular to the longitudinal direction of the transport container 1 or are aligned roughly parallel to the longitudinal direction of the transport container 1, as is illustrated by way of example in the represented example with the help of some bank-note bundles 2. In the represented example, the bank-note bundles 2 aligned parallel to the longitudinal direction of the transport container 1 are located between two rows of bank-note bundles aligned perpendicular to the longitudinal direction 2 as well as between such a row of bank-note bundles on the one side and a side wall of the transport container 1 in the longitudinal direction on the other side.

Figure 2:
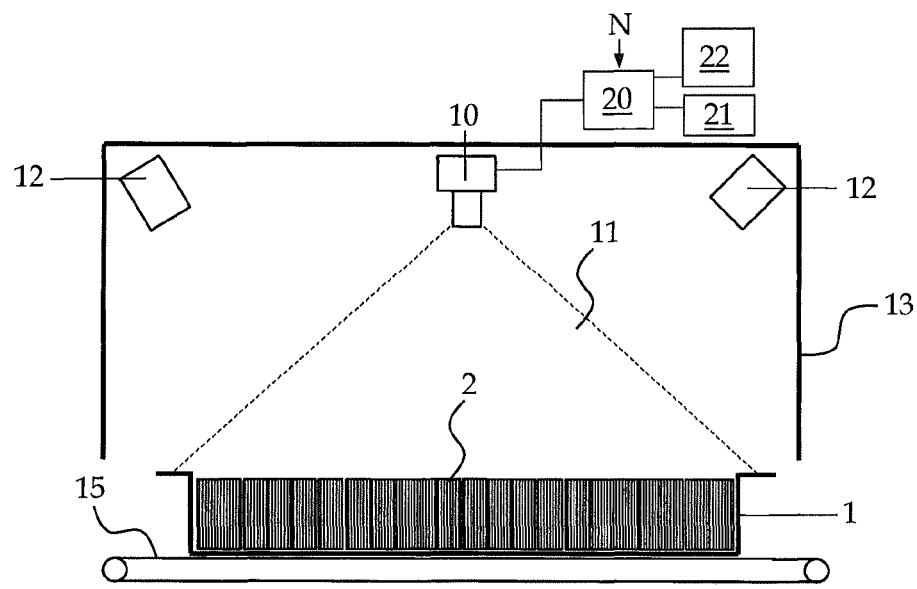
FIG. 2 a first example in a side view of a cross section of an apparatus for counting bank-note bundles.

FIG. 2 shows a cross-sectional representations in a side view of a first example of an apparatus for counting bank-note bundles. The apparatus has an image-capturing device 10, e.g. a camera which is configured for capturing spatially resolved images of the bank-note bundle 2 located in a transport container 1. The image captured of the bank-note bundles 2 to be counted can be an individual image or a series of images, for example in the form of a video recording. In the present example, the field of view of the image-capturing device 10 is so large that the transport container 1, including the bank-note bundles 2 located therein, lies within the field of view 11.

Further, the illumination devices 12 are provided, by means of which the bank-note bundles 2 to be counted are illuminated. Here the light generated by the illumination devices 12 lies preferably in the visible and/or infrared and/or ultraviolet spectral region.

To ensure conditions as defined as possible upon the image capture, preferably a housing 13 is provided which surrounds the image-capturing device 10 and the illumination devices 12 and is configured in form and/or size such that the transport container 1 introduced into the interior of the housing or located in the region of a lower opening of the housing 13 and the bank-note bundles 2 located therein are shielded from an illumination by ambient light.

Further, a transport device 15, for example a conveyor belt, can be provided through which the bank-note bundles 2 to be counted, in particular the transport container 1 containing the bundles 2, can be conveyed into the interior of the housing 13 and/or into the region of the lower opening of the housing 13.

In the event that the field of view 11 of the image-capturing device 10 is smaller than the length or width of the transport container 1, the image-capturing device 10 is actuated such that this captures a sequence of images while the transport container 1 with the bank-note bundles 2 located therein is transported past the image-capturing device 10 with the help of the transport device 15. Alternatively or additionally, however, it is also possible to attach the image-capturing device 10 to a suitable transport device (not represented) which moves the image-capturing device 10 relative to the transport container 1 or the bank-note bundles 2 to be counted during the image capture.

As was already explained in connection with FIG. 1, the individual bank-note bundles are deposited upright in the transport container 1 so that the bundling elements 3 combining the respective bank-note bundle 2 is visible from the upper side of the transport container 1. Accordingly, besides the bank notes of the respective bundle 2, the bundling element 3 is also visible in the images recorded by the image-capturing device 10.

The image data obtained by upon the image recording are relayed to an evaluation device 20 and are evaluated there, where applicable after a preprocessing, by means of image recognition, wherein in particular the bundling elements 3 rendered in the image or images are identified and counted. The number of the bundling elements 3 established in this manner then corresponds to the number of the bank-note bundles 2 located in the transport container 1.

Preferably, the evaluation device 20 is configured to compare the hereby established number of bundling elements 3 or bank-note bundles 2 with a pre-specified number N. Preferably, the pre-specified number N corresponds to the number of bank-note bundles 2 respectively picked in a transport container 1. The pre-specified number N can, for example, also be supplied with the respective transport container 1, for example by storing this in an information carrier provided in the transport container 1 or its cover, or supplied therewith, or by writing it thereto in encoded form or as a plaintext.

Preferably, the evaluation device 20 is configured such that this, in dependence on the result of this comparison, actuates an output device 22 for outputting a corresponding information item. If, for example, the comparison yields that the established number and the pre-specified number N are identical, this is signaled to an operator, for example by lighting up a green lamp, by displaying "OK" or "Number of bank-note packs correct" and/or by a corresponding acoustic output. However, in the event that the established number does not match the pre-specified number N, the operator is likewise informed accordingly, for example by lighting up a red lamp, by outputting "STOPP" or "Number of bank-note packs incorrect" or a corresponding acoustic notification. Optionally, it is also possible to output instructions directed to the operator, such as "Remove container!" or "Repeat counting operation!".

The individual bundling elements 3 in the recorded images are established preferably with the help of methods of image processing and machine vision. For example, the bundling elements 3 are established with the help of a segmentation for which the portions rendered in the recorded image of the bundling elements 3 are recognized as a respectively contiguous region as regards content and are therefore distinguished from other image regions in which, for example, only the cut edges of the bank-note bundles 2 are rendered.

Besides pixel-, edge- or region-oriented methods, methods can also be employed upon the segmentation for which the form and/or size of the bundling elements 3 respectively to be expected and/or their textures is taken into consideration. An identification of the bundling elements 3 is therefore possible in especially reliable manner because these differ as a rule by their form and size as well as by their texture, thus their surface condition, distinctly from image regions in which the respective cut edges of the bank notes of a bank-note bundle 2 are rendered.

Alternatively or additionally, it can be provided to irradiate the bank-note bundles 2 to be counted with ultraviolet radiation. This is especially advantageous if the bundling elements 3 contain substances which can be excited by ultraviolet radiation for giving off fluorescence radiation. If, for example, bands made from paper are employed as bundling elements 3, the optical brighteners usually contained in the paper are excited by the ultraviolet radiation for emitting fluorescence light. In the recorded images, the bundling elements 3 then appear substantially brighter than the cut edges of the respective bank-note bundle 2 so that these can be distinguished or recognized with high reliability.

Preferably, the radiation spectrum emitted by the illumination devices 12 contains, besides ultraviolet radiation, no spectral portions or at least negligible spectral portions in the visible spectrum. It is therefore attained that, for example, in case of bands made from paper in the respectively captured images merely the bundling elements 3 can be recognized in the form of luminous squares or rectangles, while the other, non-fluorescent image regions are substantially dark. The automatic identification as well as the counting of the bundling elements 3 rendered in the recorded image therefore becomes possible with particular high reliability.

Alternatively or additionally, it can be provided that the bank-note bundles 2 to be counted including bundling elements 3 are irradiated with infrared radiation so that optionally existing security features on or in the respective bundling element 3 can be made visible. In this manner, not only the number of the bank-note bundles 2 located in a transport container 1 can be reliably ascertained, but also the authenticity of the bundling elements 3 combining the respective bank-note bundles 2 can be checked.

Preferably, a storage device 21 is additionally provided in which are stored the images captured by means of image-capturing device 10 of the bank-note bundles 2 respectively to be counted, preferably together with an identification number for the respective transport container and/or the established number of the bank-note bundles 2 located therein. It is therefore possible to establish and to document not only the number of the bank-note packs 2 located in the transport container 1, but to simultaneously archive the image forming the basis for the establishment of the number, in order to be able to make it available when required at a later time point for proof purposes.

Figure 3:
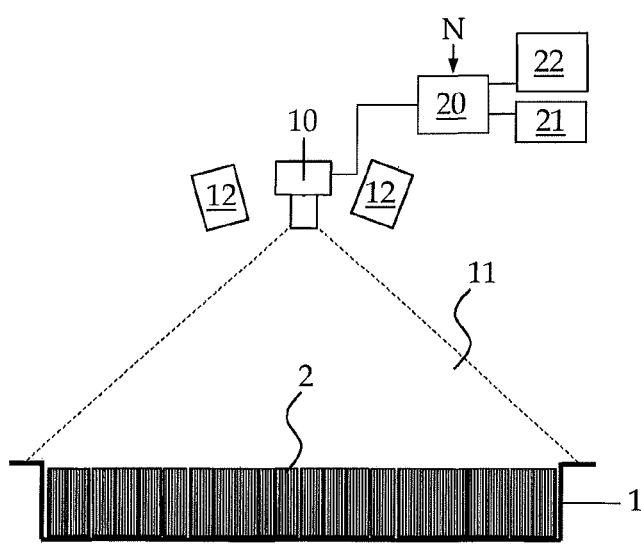
FIG. 3 a second example in schematized side view of a cross section of an apparatus for counting bank-note bundles.

FIG. 3 shows a cross section in a side view of a second example of an apparatus for counting bank-note bundles. As in the example shown in FIG. 2, a plurality of bank-note bundles is located upright in a transport container 1 also in this example, however, which in this case is not shielded against an illumination by ambient light.

For example, the transport container 1 can be simply put down on a work table (not represented) above which an image capturing device 10 is attached.

For example, the image capturing device 10 can be mounted at the respective room ceiling. Alternatively, however, it is also possible to provide a mount above the work table, for example a carrier or cantilever, which the image capturing device 10 is attached to.

Preferably, the distance between the image-capturing device 10 and the transport container 1 is chosen such that the transport container 1 and the bank-note bundles 2 located therein lie within the field of view 11 of the image-capturing device 10.

Depending on the lighting conditions in the workplace, illumination devices 12 can be provided, by means of which the bank-note bundles 2 are irradiated with light, in particular in the visible and/or ultraviolet and/or infrared spectral region.

Alternatively or additionally, the photosensitivity of the image-capturing device 10 and/or the illumination of the relevant workplace, however, can also be chosen in such a way that additional illumination devices 12 can be omitted.

Otherwise, the statements in connection with the first example shown in FIG. 2 apply accordingly to the second examples shown in FIG. 3.

The invention claimed is:

1. An apparatus for counting a plurality of value-document bundles, each of the value-document bundles including several value documents, each of the several value documents combined by a bundling element, the apparatus comprising:
an image-capturing device which is configured to capture in one image the plurality of value-document bundles including respectively the bundling elements,
an evaluation device which is configured to identify the bundling elements in the image as a band by which the value documents of the respective value-document bundle are held together and to establish their number; and
an output device for outputting information items,
wherein the evaluation device is configured to identify each of the plurality of value-document bundles from the image based on the image of the band that holds the respective value-document bundle together,
wherein the evaluation device implements a segmentation analysis of the image to determine a region including the band and other regions including portions of the value documents, and
wherein the evaluation device is configured to compare the established number of the bundling elements with a pre-specified number and to actuate the output device for outputting an information item in dependence on the result of the comparison.

2. The apparatus according to claim 1, wherein the evaluation device is configured to identify the bundling elements on the basis of shape or size or texture.

3. The apparatus according to claim 1, wherein the evaluation device is configured to identify the bundling elements on the basis of a fluorescence behavior of the bundling elements.

4. The apparatus according to claim 1, further comprising at least one illumination device which is configured for illuminating the value-document bundles including the bundling elements.

5. The apparatus according to claim 4, wherein the illumination device is configured for illuminating the value-document bundles including the bundling elements with ultraviolet radiation.

6. The apparatus according to claim 1, wherein the evaluation device is configured to identify the bundling elements in the form of paper strips.

7. The apparatus according to claim 1, further comprising a storage device which is configured to store the captured image of the value-document bundles including bundling elements, in particular for the purpose of archiving.

8. The apparatus according to claim 1, further comprising a housing in whose interior the image-capturing device or an illumination device is or are arranged, wherein the housing has at least one opening by which a value-document container, in which the value-document bundles to be counted are located, can be brought into the interior of the housing.

9. The apparatus according to claim 8, wherein the size or form of the housing is adaptable to the size or form of different value-document containers.

10. The apparatus according to claim 1, wherein the image-capturing device and/or the illumination device is or are attached at a room ceiling.

11. The apparatus according to claim 1, further comprising a transport device which is configured to move the image-capturing device and the value-document bundles, which are located in particular in a value-document container, relative to each other during the image capture.

12. The apparatus according to claim 1, further comprising a communication device which is configured to write the established number of the bundling elements to a storage element provided in a value-document container in which the value-document bundles to be counted are located.

13. A method for an apparatus that includes an evaluation device and an output device to count a plurality of value-document bundles, each of the value-document bundles including several value documents, each of the several value documents combined by a bundling element, wherein the method comprises the following steps:

capturing in one image the plurality of value-document bundles including respectively the bundling elements, identifying the bundling elements in the image as a band by which the value documents of the respective value-document bundle are held together, and establishing the number of the bundling elements on the basis of the bundling elements identified in the image;

wherein the evaluation device is configured to identify each of the plurality of value-document bundles from the image based on the image of the band that holds the respective value-document bundle together, wherein the evaluation device implements a segmentation analysis of the image to determine a region including the band and other regions including portions of the value documents, and wherein the evaluation device is configured to compare the established number of the bundling elements with a pre-specified number and to actuate the output device for outputting an information item in dependence on the result of the comparison.

14. The apparatus according to claim 1, wherein the evaluation device is configured to identify the bundling elements by optical properties of the bundling elements.

15. The apparatus according to claim 4, wherein the illumination device is configured for illuminating the value-document bundles including the bundling elements with infrared radiation.

16. The apparatus according to claim 1, wherein the image-capturing device is configured to capture the image of a first longitudinal cut edge of the plurality of value-document bundles, the plurality of value-document bundles arranged with a second longitudinal cut edge on a bottom surface of a container.

17. The apparatus according to claim 1, wherein the image-capturing device and/or the illumination device is or are attached over a work table.

18. The apparatus according to claim 1, wherein the pre-specified number corresponds to a number of value-document bundles together in a respective container, and wherein the pre-specified number is provided on the container.

19. The apparatus according to claim 1, wherein the plurality of value-document bundles and a container in which the plurality of value-document bundles are arranged for transportation and/or storage are visible within a field of view of the image-capturing device.

* * * * *